March 30, 1943.  A. H. R. FEDDEN ET AL  2,315,409
BEVEL-GEARING
Filed Jan. 14, 1942  3 Sheets-Sheet 1

Inventors
Alfred H. R. Fedden
Leonard F. G. Butler
Frederick M. Thomas
and Peter R. Price
by Wilkinson & Mawhinney
Attorneys.

Inventors
Alfred H. R. Fedden
Leonard F. G. Butler
Frederick M. Thomas
and Peter R. Price
by Wilkinson & Mawhinney
Attorneys.

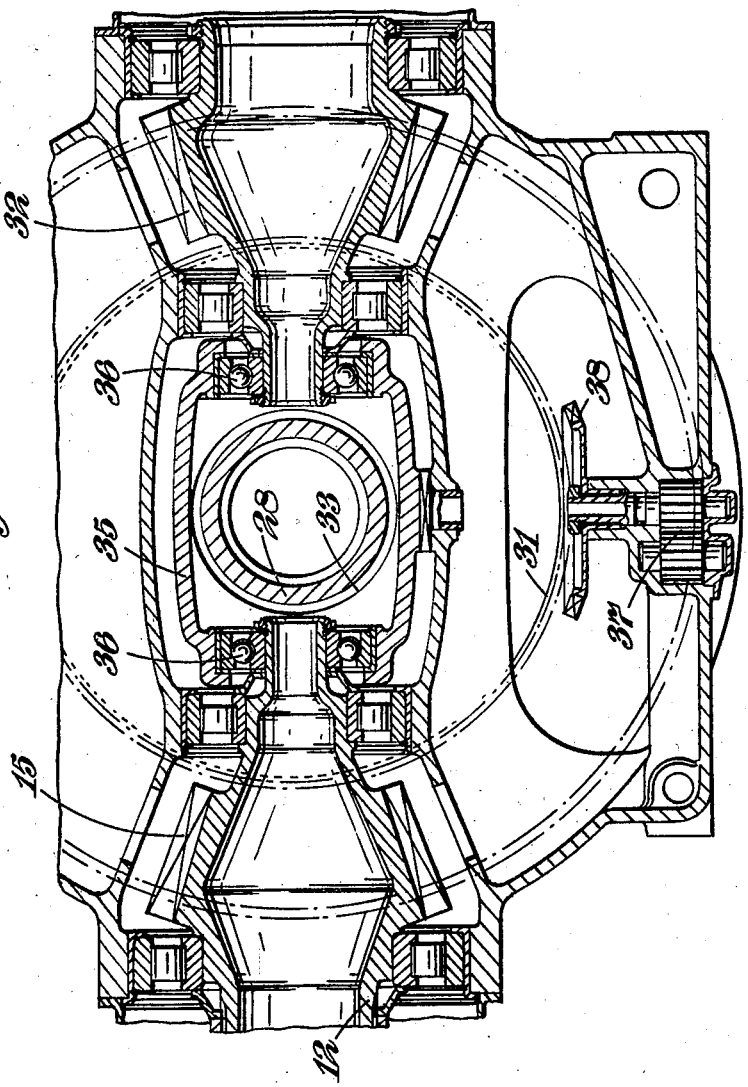

Patented Mar. 30, 1943

2,315,409

UNITED STATES PATENT OFFICE 2,315,409

BEVEL GEARING

Alfred Hubert Roy Fedden and Leonard Frederick George Butler, Bristol, England, Frederick Metcalf Thomas, North Adams, Mass., and Peter Ralph Price, Bristol, England, assignors to The Bristol Aeroplane Company Limited, Bristol, England, a British company Application January 14, 1942, Serial No. 426,779 In Great Britain January 17, 1941

6 Claims. (Cl. 74—410)

This invention relates to improvements in bevel-gearing and has for its object to provide an improved construction and arrangement of such gearing whereby certain advantages, as hereinafter explained, can be obtained.

According to this invention, there is provided in a bevel-gear transmission, the combination with a driving bevel-gear and a driven bevel-gear meshing with it, of a second driving connection between them through two idler gears.

The invention is of particular advantage when the driving and driven shafts are at right-angles to one another, and in this arrangement the invention comprises the combination with a driving bevel-gear (the first bevel-gear) fast on the driving shaft and a driven bevel-gear (the second bevel-gear) fast on the driven shaft meshing with it, of a third bevel-gear coaxial with the driven shaft and meshing with the driving bevel-gear, and a fourth bevel-gear meshing with and driven by the third bevel-gear and also meshing with the driving the second bevel-gear.

According to yet another feature of this invention, the first and fourth bevel-gears aforesaid may be mounted coaxially with one another and connected by a member which permits movements of these two gears as a unit longitudinally of their axis for the purpose of ensuring a more uniform distribution of the loading on the teeth of the gears.

The invention also comprises the application of a bevel-gear train as above described to an aircraft as described in the specification of concurrent British patent application No. 701/41 in which the airscrews are spaced away laterally from the engine or engines and driven by a transmission system which includes a transmission shaft at right-angles to the airscrew shaft.

Figure 1:
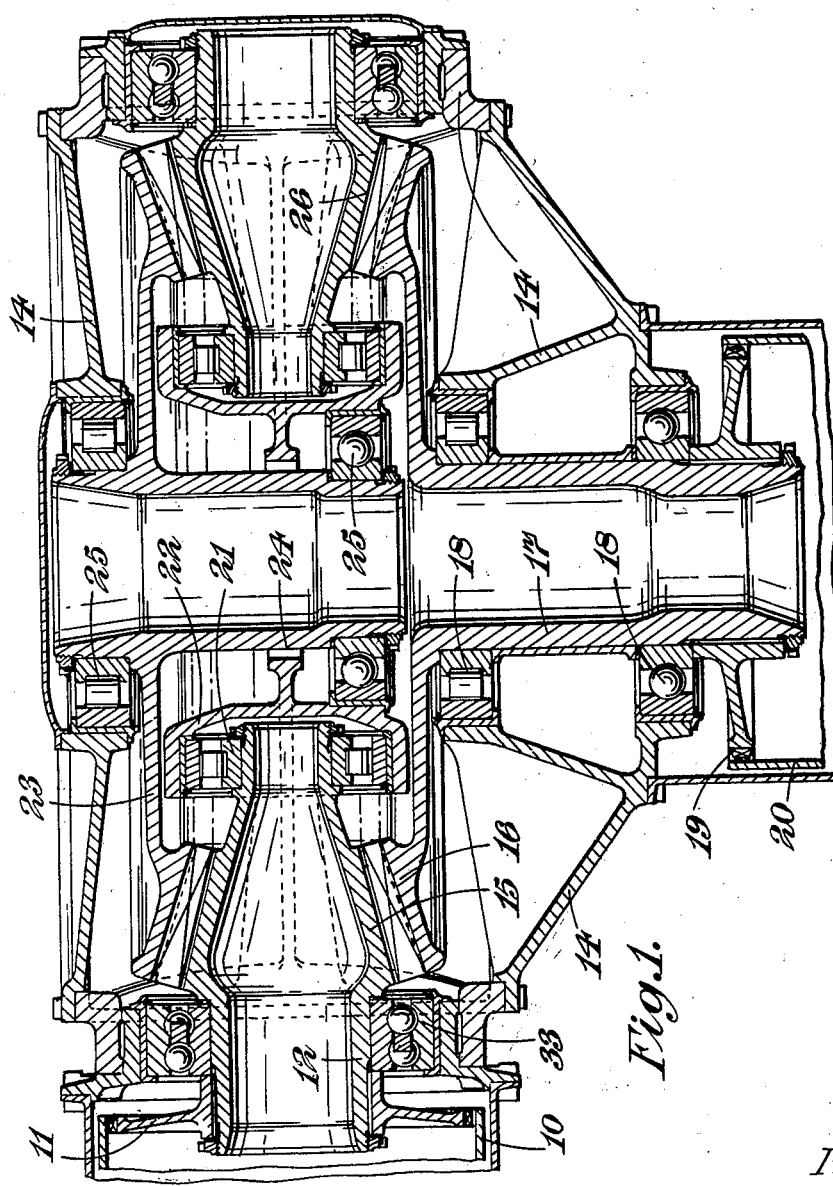
Figure 2:
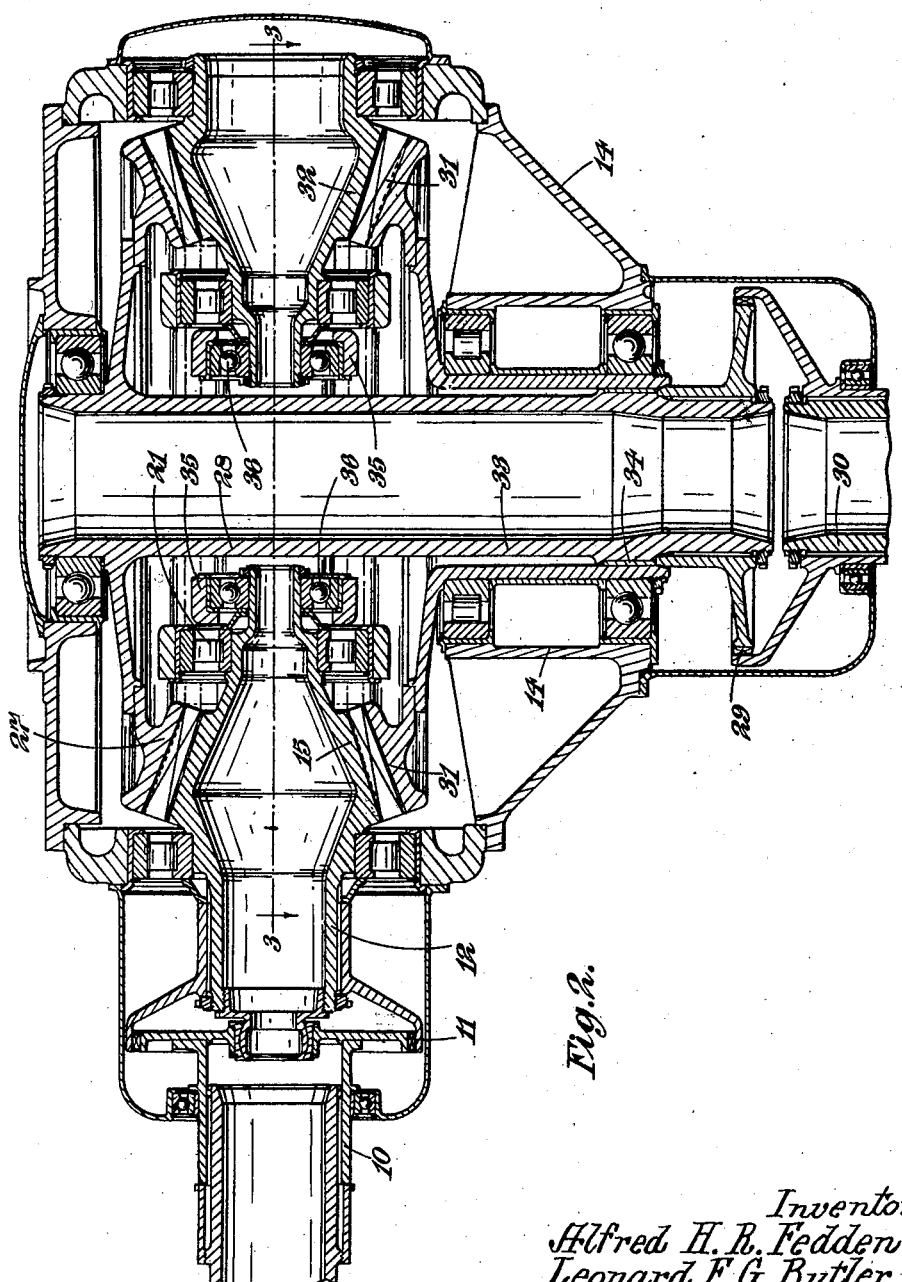

In the accompanying drawings:

Figure 1 is a central sectional view of a gear-train according to the present invention, Figure 2 is a similar view of a modified construction, showing a train in which the direction of rotation of the driven shaft is reversed relatively to that of the driving shaft from the arrangement shown in Figure 1, and Figure 3 is a section on the line 3—3 of Figure 2.

Referring first to Figure 1, which illustrates a gear-train for an airscrew drive as mentioned above, the driving shaft 10, which may be a shaft extending along inside a wing from an engine mounted in the fuselage of an aircraft to an airscrew located on the wing, is coupled by a flexible connection 11 to a shaft 12 mounted by bearings 13 in a suitable casing 14 and carrying a bevel-pinion 15. This gear 15 meshes with a larger bevel-wheel 16 carried by a shaft 17 which is rotatable in bearings 18 also carried by the casing 14; this shaft 17 is connected by a suitable flexible coupling 19 to a shaft 20 which may constitute the airscrew shaft, or transmits a drive to the airscrew shaft.

The inner end of the shaft 12 is carried by a bearing 21 in a housing 22 which is supported in the casing 14 by suitable webs.

The feature of the present invention consists in the provision of a second bevel-wheel 23 which is mounted coaxially with the shaft 17 on a short shaft 24 mounted in bearings 25 carried by the casing 14, and this wheel 23 transmits a drive from the bevel-gear 15 to a bevel-pinion 26 mounted coaxially with the gear 15 so that it also meshes with the driven bevel-wheel 16 aforesaid.

With this arrangement the drive from the bevel-gear 15 is transmitted directly to the bevel-wheel 16 and also indirectly through the two idlers 23, 26; since the driving thrust is exerted from two diametrically opposite points on the gear 15 and is also applied at two diametrical points on the gear 16, the tooth-loading is reduced so that the tooth-dimensions of the various gears may be reduced to about half of what they would be with an ordinary bevel transmission having only one point of engagement between the driving and driven gears. This is an important advantage in that it enables a very substantial reduction to be made in the dimensions and weight of the gear-train.

In Figure 2 there is illustrated a modified construction of the gear-train whereby the direction of rotation of the driven shaft relatively to that of the driving shaft is reversed. Figure 2 also shows slight modifications of design, in for example, the arrangement of the bearings for the various shafts, but such changes are immaterial and merely matters of design.

The direction of rotation of the driven shaft 20 in Figure 1 is determined by the fact that the gear-weel 16 which directly drives that shaft engages the driving gear 15 on the side adjacent the shaft 20. In the modification illustrated in Figure 2 the direct drive to the driven shaft is taken from the opposite side of the driving bevel-gear and the direction of rotation of the driving shaft is therefore the opposite of that in Figure 1.

The driven shaft 10 in Figure 2 is flexibly connected at 11 to the driving bevel-gear 15, and the latter drives directly through the bevel-wheel 27 the shaft 28 which is flexibly connected at 29 to the airscrew shaft 30 corresponding to the shaft 20 of Figure 1. The shaft 28 therefore extends across the axis of the bevel-gear 15 through the casing 14. The indirect drive is in this case transmitted from the bevel-gear 15 through a bevel-wheel 31 to an idler-pinion 32 which meshes with the drives the bevel-wheel 27; the wheel 31 is mounted on a hollow shaft 33 which is supported in suitable bearings in the casing 14 and surrounds the shaft 28 which engages it by a suitable bearing such as the bush 34.

The inner end of the shaft 12 carrying the bevel-gear 15 is supported as in Figure 1 by a bearing 21, and the idler-pinion 32 is also supported in bearings in the casing 14 in the same way, but in order to provide a satisfactory distribution of the tooth-loading, the bearings for the gear 15 and pinion 32 are of a type which will permit of slight axial movement, and these two pinions are coupled together by a tie-member 35 (Figure 3) which engages each of them by a radial and thrust bearing 36 so that they move in unison; during operation of the train any variation in the tooth-loading produces a slight longitudinal displacement of the two elements 15 and 32 which tends to equalise the loading on the gears between the direct and the indirect drive.

In Figure 3 there is also shown means for lubricating the gear-train comprising a gear-pump 37 driven by a bevel-gear 38 which receives a drive from the gear-wheels 27 and 31; this pump is situated in the lower part of the casing and delivers the oil by suitable passages to the various points requiring lubrication.

It will be appreciated that the general design of the gear-train with the direct and indirect drives as above described offers important advantages from the production or manufacturing point of view in that the selection of the rotation of the driven shaft involves the changing of comparatively few parts of the complete mechanism, amounting substantially only to changing the shafts 17 and 24 of Figure 1 with some of their bearings. When this arrangement is used for driving airscrews as described in the specification of British patent application No. 701/41 aforesaid in which both airscrews are driven from the same power plant, it is desirable that they should operate in opposite directions, and this is conveniently effected by using one of each kind of gear-box since the transmission-shafts rotate in opposite directions.

Whilst a single idler-pinion 26 was described with reference to Figure 1, it will be appreciated that two or more such idler-pinions could be used, spaced around the driven bevel-wheel to reduce the tooth-loading on them; this will not enable any further reduction in tooth-dimensions to be effected since these are determined by the tooth-loading on the driving pinion 15. Furthermore it will be appreciated that instead of driving a single airscrew, a gear-train as hereinbefore described may be readily adapted to drive a pair of coaxial contra-rotating airscrews.

We claim:

1. A right-angle bevel gear transmission, comprising in combination a casing, a pair of similar bevel gears coaxially mounted in the casing to face one another with their adjacent faces spaced apart, a driving shaft coaxial with said bevel gears and coupled to one of them, a second pair of coaxial bevel gears each meshing with both bevel gears in the first pair, a supporting shaft rotating with one of the second pair of bevel gears extending into the space between the first pair of bevel gears and supported by a bearing from the casing, a second supporting shaft rotating with the other bevel gear in the second pair extending away from the space beteween the first pair of bevel gears and supported by bearings from the casing, and a driven shaft coupled to one of the supporting shafts.

2. A right-angle bevel-gear transmission according to claim 1, in which the driven shaft is coupled to the outer end of the second supporting shaft.

3. A right angle bevel gear transmission comprising in combination, a casing, a pair of similar bevel gears coaxially mounted in the casing with their adjacent faces spaced apart, a driving shaft coaxial with said bevel gears and coupled to one of them, a second pair of coaxial bevel gears each meshing with both bevel gears in the first pair, a tubular supporting shaft rotating with one of the second pair of bevel gears and supported by bearings from the casing, a second supporting shaft rotatable with the other bevel gear in the second pair extending through the space between the first pair of bevel gears and through the first supporting shaft and supported by bearings from the casing and a driven shaft coupled to the second supporting shaft.

4. In a bevel-gear transmission, a driving shaft, a driven shaft of which the axis intersects that of the driving shaft at right angles, a pair of similar coaxial bevel-gears of which one is driven by the driving shaft, a second pair of similar coaxial bevel-gears of which one drives the driven shaft and both mesh with both bevel-gears in the first pair, coaxial bearings supporting one pair of bevel-gears, coaxial bearings supporting the other pair of bevel-gears with limited freedom for axial movement and a thrust bearing engaged with both bevel-gears of the latter pair and arranged to transmit the axial load on each said bevel-gear to the other.

5. In a bevel-gear transmission, a driving shaft, a driven shaft of which the axis intersects that of the driving shaft at right-angles, a pair of similar coaxial bevel-gears of which one is driven by the driving shaft, a second pair of similar coaxial bevel-gears of which one drives the driven shaft and both mesh with both bevel-gears in the first pair, coaxial bearings supporting one pair of bevel-gears, coaxial bearings supporting the other pair of bevel-gears with limited freedom for axial movement, and a tie-member extending between the latter bevel-gears and carrying two thrust bearings engaged one with each said bevel gear to transmit the axial load on each said bevel-gear to the other.

6. In a bevel-gear transmission, a driving shaft, a driven shaft of which the axis intersects that of the driving shaft at right-angles, a casing, a pair of similar coaxial gears mounted in the casing coaxial with the dirving shaft by bearings that permit a limited axial movement of the gears in the casing, means coupling one said bevel-gear to the driving shaft to be driven thereby, thrust-transmitting means mounted between the said bevel-gears to transmit the axial load on each of them to the other, a second pair of similar coaxial gears mounted in the casing coaxial with the driven shaft and each meshing with both the first pair of bevel-gears by radial and thrust bearings that transmit the axial loads on the second pair of bevel-gears to the casing and means coupling one of the second pair of bevel gears to the driven shaft to drive it.

ALFRED HUBERT ROY FEDDEN.
LEONARD FREDERICK GEORGE BUTLER.
FREDERICK METCALF THOMAS.
PETER RALPH PRICE.